April 22, 1941.         C. J. HOLLAND         2,239,096
HATCH COVER OPERATING DEVICE
Filed Jan. 8, 1940          2 Sheets-Sheet 2
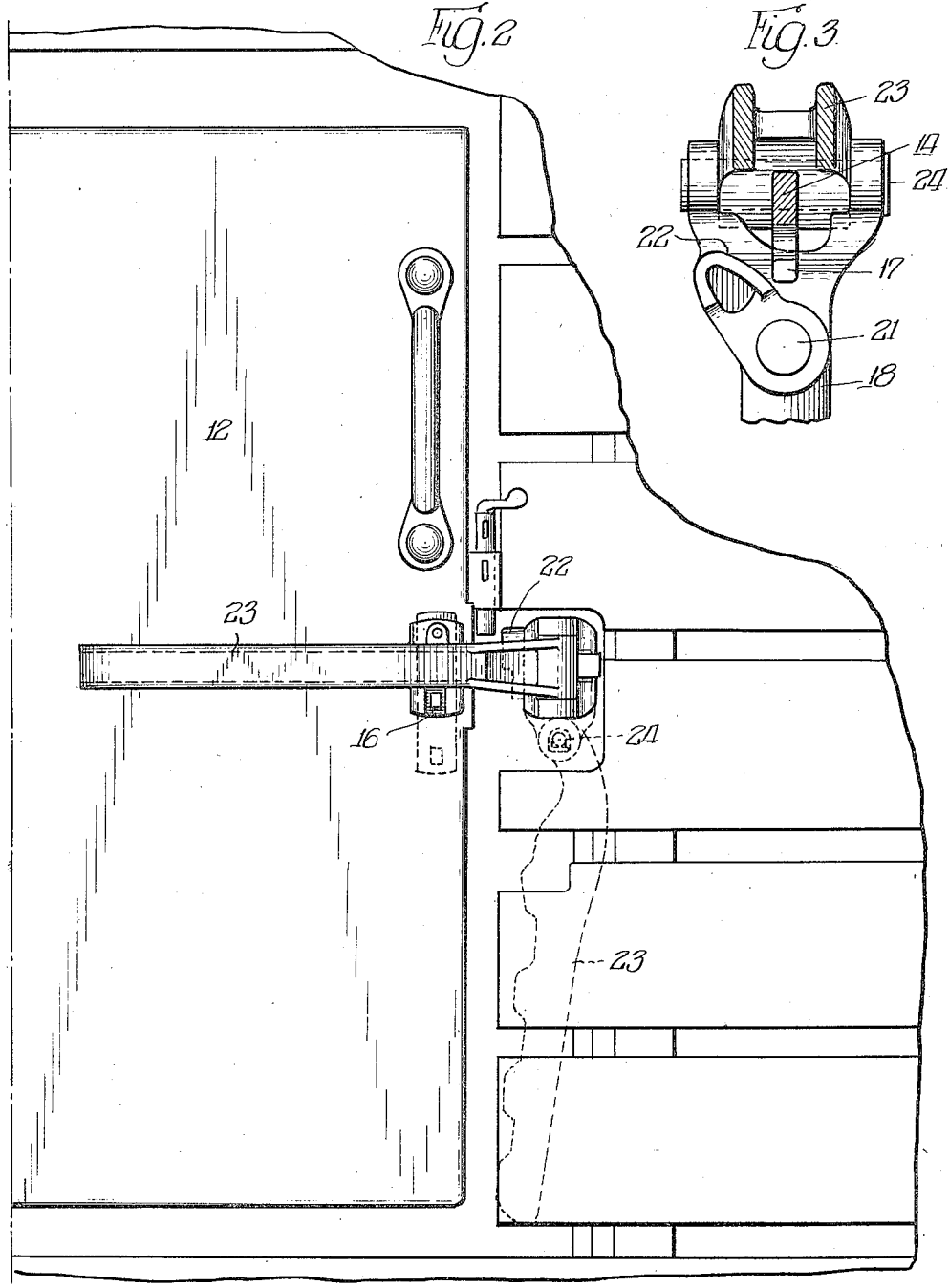
INVENTOR.
Cyrus J. Holland,
BY
ATTORNEY.

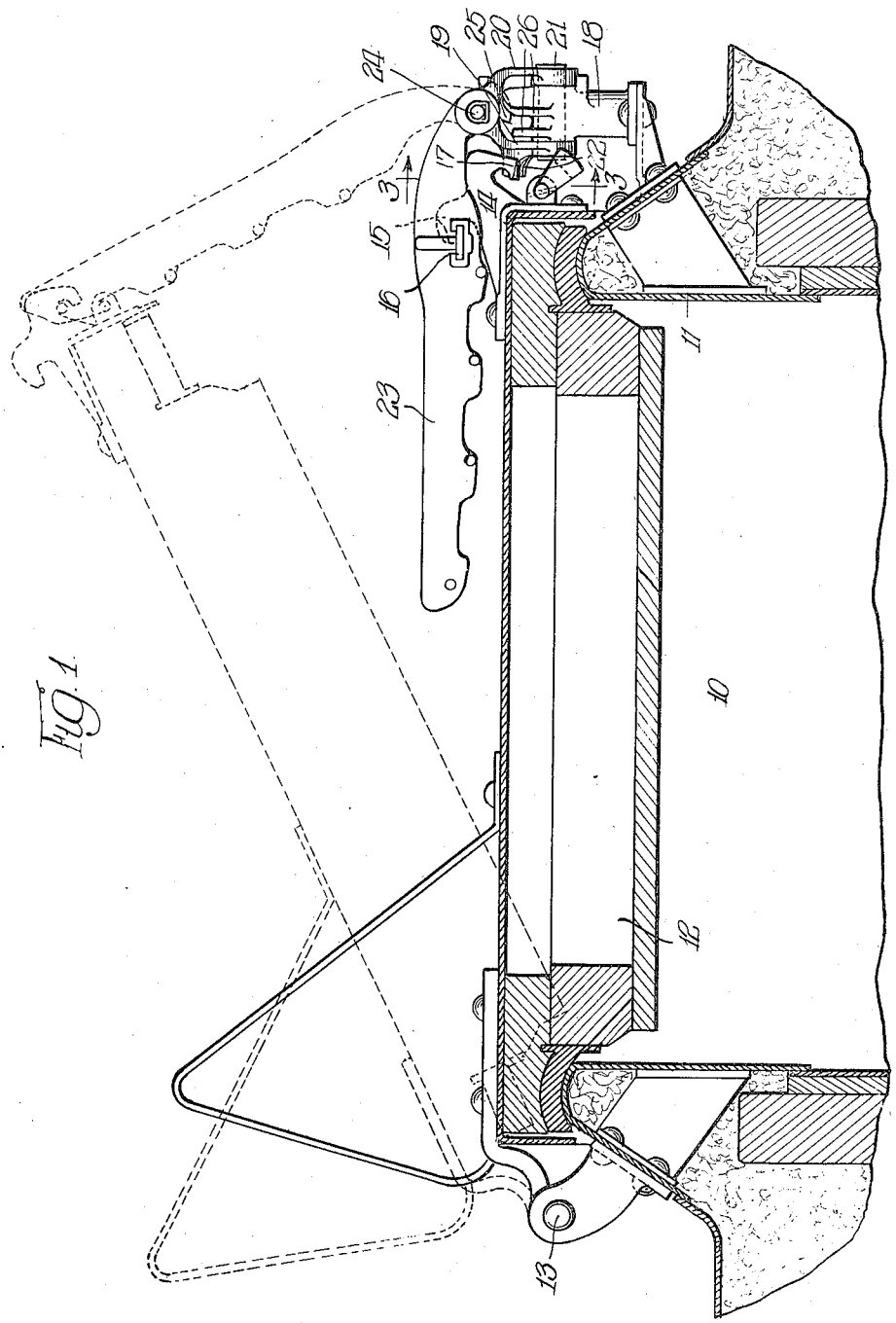

Patented Apr. 22, 1941

2,239,096

UNITED STATES PATENT OFFICE 2,239,096

HATCH COVER OPERATING DEVICE

Cyrus J. Holland, Chicago, Ill.

Application January 8, 1940, Serial No. 312,893

5 Claims. (Cl. 268—109)

My invention relates to hatch covers and particularly to a device for supplementing the apparatus described and claimed in the copending application of August W. L. Hartbauer, Serial Number 235,415, filed October 17, 1938. It may also be adapted for use with other types of closure arrangements, more especially with those where the operating lever combines cross and lateral directions, as it is moved from the closed to the ultimate release position.

In the operation of refrigerating cars, particularly in winter weather, it is frequently difficult to "crack" the hatch; that is, disengage it from its closed position. This may be due to sleet, ice or snow or to adherence between the tightly sealed engaging surfaces between the cover and the hatch frame.

I am aware that devices have been suggested for that purpose involving the use of the closure operating lever, but usually such devices are integral with or movably attached to the operating lever and related so as to move into engagement lifting the cover slightly as the lever is moved off the cover to the upright position thereof. Such single movement of the lever is inadequate to provide for the lifting surfaces to move out of engagement to prevent fouling. This condition usually results in damage to the car or hatch closure parts when the cover is again closed and may result in personal injury.

It is the object of this invention to provide a hatch cover initial lifting means as a part of the operating unit of the hatch closure mechanism, adapted to function as the said unit is moved from the upright neutral release position, to its ultimate release position to the front of the hatch cover, whereby the hatch cover is raised slightly and the lifting elements move out of engagement to prevent damage to the car or hatch closure parts or personal injuries to operators as the cover is again closed.

In the accompanying drawings I have disclosed apparatus for accomplishing the desired result, the parts being so arranged that the force needed to dislodge the cover may be exerted to the best advantage; that is, with the lever in its vertical position where its greatest leverage is possible. Furthermore, the parts are so arranged that no knowledge of the construction is necessary on the part of the trainman in order to accomplish the desired result; in other words, the trainman merely breaks the cover seal, removes the key, lifts the lever to a vertical position, then pushes it laterally downward out of the way, which last action results in slightly raising the cover.

The invention will be more readily understood by reference to the drawings, in which:

Fig. 1 is a sectional view through a hatch cover and operating means, such as contemplated, the cover being shown in dotted lines in a ventilating position;

Fig. 2 is a fragmentary plan view; and,

Fig. 3 is an enlarged sectional view on the line 3—3 of Fig. 1.

In the drawings I have illustrated a hatch opening 10 surrounded by a frame 11, the opening being closed by a cover 12 mounted on hinges 13.

At the edge of the cover opposite the hinges I mount on its top side a bracket 14 having a hook projection 15 for engagement by the lock key 16, and an overhanging hook projection 17 adapted to function when the parts are in ventilating position. The lower end of the hook 17 functions in another manner in connection with the lifting cam, later to be described.

A frame bracket 18 is secured to the frame and provides a mounting for a lever extension, two legs 19—20 of which straddle the bracket and provide connections for a horizontal pivot pin 21, the axis of which is transverse to the edge of the cover. The leg 19 of the lever extension carries a cam 22, best shown in Fig. 3, adapted to cooperate with the portion 17 of the cover bracket in a manner later to be described.

The lever 23 is mounted for oscillation on a horizontal pivot 24, the axis of which is parallel to the side of the cover and thus at right angles to the pivot 21. The overhung end 25 of the lever is shaped to cooperate with projections 26 on the upper end of the frame bracket in such manner that when the lever is in any position over the cover, such as shown either in full lines or in dotted lines in Fig. 1, the lever extension is held rigidly in a vertical position. It is only when the lever is moved to a full vertical position that the overhung end 25 of the lever is free of the projection 26 on the bracket. In that position the lever may then be swung to a position alongside of the hatch cover as shown in dotted lines in Fig. 2. In the movement to this idle position alongside of the cover, the cam 22 engages underneath the projection 17 of the cover bracket and "cracks" the cover; that is, lifts it slightly to break any ice or snow, or to separate the cover from its support. Of course, the cam 22 is so shaped that if the cover is down when the lever is to be moved backward to its locking position the cover will be slightly raised to permit the cam to pass the projection.

As stated, the parts are shown in dotted lines in Fig. 1 with the cover in ventilating position, this being illustrated merely to explain the added function of the cover bracket 14 as a part of the ventilation lock. However, such ventilation locking means has no relation to the invention claimed herein and will not be further described.

I claim:

1. Hatch cover operating means for use with a cover and a hatch frame, comprising, in combination, brackets secured respectively to said cover and frame, the cover bracket having a portion projecting over the edge of the cover, an operating-lever-extension mounted on the frame bracket for oscillation on a pivot, the axis of which is transverse to the adjacent frame, said lever extension having a cam, and an operating lever mounted for oscillation on the lever extension on a pivot, the axis of which is parallel to the adjacent frame, said cam being positioned to cooperate with the extension on the cover bracket to raise the cover when said lever extension is caused to rotate from a vertical to a horizontal position.

2. Operating means for use with a hatch cover and hatch frame comprising, in combination, a lever mounted alongside said cover, means in the mounting of said lever for defining the path of movement of said lever in which said lever is caused to swing upward from a position over the cover to a position laterally alongside of said hatch opening, and cam means in said lever mounting acting when said lever moves laterally whereby to lift the cover.

3. Operating means for use with a hatch cover and hatch frame, comprising, in combination, a lever, a lever extension and a frame bracket, the extension being pivoted for oscillation on the frame bracket and the lever being pivoted on the extension for oscillation in a plane at right angles to that of the extension, means defining a path of movement of the lever from a position over the cover to a vertical position, thence to a position laterally alongside of the hatch opening, and cam means carried by the lever extension and cooperating with the cover whereby as the lever and the extension are moved to a position alongside of the hatch opening the cover is lifted.

4. Operating means for use with a hatch cover and hatch frame, comprising, in combination, a bracket projecting over the edge of the cover, a bracket secured to the frame, a lever extension mounted for oscillation on the frame bracket, a lever mounted on the lever extension for oscillation on a pivot arranged transversely to the pivot on which the extension is mounted, cooperating means on the frame bracket and lever for defining and limiting the movement of the lever, and cam means on the lever extension for engaging the projecting bracket on the cover whereby when the lever and extension are moved toward an idle position alongside of the cover, the cover is lifted.

5. Operating means for use with a hatch cover and hatch frame, comprising, in combination, a fixed extension from the edge of the cover, a frame bracket, a lever extension mounted for oscillation on the bracket, a lever mounted for oscillation on the lever extension on a pivot, the axis of which is at right angles to that of the lever extension pivot, cooperating means on the frame bracket and lever for maintaining the lever extension rigidly in a vertical position when the lever is in a position overlying the cover and for releasing the extension when the lever is in a vertical position, and a cam on the lever extension adapted to cooperate with the extension on the cover when the extension is swung with the lever in a vertical position to an idle position alongside of the cover.

CYRUS J. HOLLAND.